United States Patent
Murata et al.

(10) Patent No.: US 6,849,177 B2
(45) Date of Patent: Feb. 1, 2005

(54) PHOTOCATALYST REACTION APPARATUS

(75) Inventors: Toshiaki Murata, Tokyo (JP); Masamichi Kikuchi, Tokyo (JP); Kazutoshi Sakurai, Tokyo (JP); Kazuo Abe, Tokyo (JP)

(73) Assignees: Mitsui Engineering & Shipbuilding Co., LTD, Tokyo (JP); Eco-Logy Corporation, Tokyo (JP)

( * ) Notice: Subject to any disclaimer, the term of this patent is extended or adjusted under 35 U.S.C. 154(b) by 237 days.

(21) Appl. No.: 10/008,784

(22) Filed: Nov. 13, 2001

(65) Prior Publication Data

US 2003/0039848 A1 Feb. 27, 2003

(30) Foreign Application Priority Data

Apr. 4, 2001 (JP) ......................................... 2001-106182

(51) Int. Cl.[7] .................................................. C02F 1/32
(52) U.S. Cl. ....................... 210/192; 210/199; 210/205; 422/186.3
(58) Field of Search ................................. 210/748, 760, 210/763, 192, 199, 205; 422/24, 186.3

(56) References Cited

U.S. PATENT DOCUMENTS

| 5,211,990 | A | | 5/1993 | Castello |
| 5,658,841 | A | * | 8/1997 | Tanaka et al. ............... 502/305 |
| 6,030,526 | A | * | 2/2000 | Porter ...................... 210/198.1 |
| 6,037,289 | A | | 3/2000 | Chopin et al. |
| 6,368,668 | B1 | * | 4/2002 | Kobayashi et al. ...... 427/376.2 |
| 6,409,928 | B1 | * | 6/2002 | Gonzalez et al. ........... 210/748 |
| 6,447,721 | B1 | * | 9/2002 | Horton, III et al. ........... 422/24 |
| 6,524,447 | B1 | * | 2/2003 | Carmignani et al. ...... 204/158.2 |
| 6,569,520 | B1 | * | 5/2003 | Jacobs ........................ 428/330 |
| 6,613,225 | B1 | * | 9/2003 | Toyoda et al. .............. 210/205 |
| 6,673,433 | B1 | * | 1/2004 | Saeki et al. ................. 428/323 |

FOREIGN PATENT DOCUMENTS

| EP | 0923988 | 6/1999 |
| EP | 1074525 | 2/2001 |
| EP | 1106574 | 6/2001 |
| EP | 1118385 | 7/2001 |
| JP | 60035065 | 2/1985 |
| JP | 5253544 | 10/1993 |
| JP | 7232080 | 9/1995 |
| JP | 2001224966 | 8/2001 |

* cited by examiner

*Primary Examiner*—Peter A. Hruskoci
(74) *Attorney, Agent, or Firm*—Fay, Sharpe, Fagan, Minnich & McKee, LLP

(57) ABSTRACT

A photocatalyst module comprising a substrate, for example, a metallic substrate, a layer of a photocatalyst such as titanium oxide, and a protective layer containing lithium silicate provided between the substrate and the layer of a photocatalyst wherein the protective layer can sufficiently withstand the heat in a step for forming the layer of a photocatalyst by a flame spray coating method and can prevents oxidation and/or decomposition of the substrate is disclosed.

5 Claims, 4 Drawing Sheets

PHOTOCATALYST REACTION APPARATUS

TECHNICAL FIELD

The present invention relates to a photocatalyst module, a method for producing the photocatalyst module, and a photocatalyst reaction apparatus provided with the photocatalyst module. More specifically, the present invention relates to a photocatalyst module comprising a substrate, a photocatalyst, and a protective layer provided between the substrate and the photocatalyst; a method for producing the photocatalyst module; and a photocatalyst reaction apparatus provided with the photocatalyst module. Further, the present invention relates to a photocatalyst reaction apparatus comprising a water tank having a photocatalyst provided therein.

BACKGROUND ART

A photocatalyst is generally employed in a state of a layer formed on the surface of an object, that is, a substrate for the purpose of oxidizing or decomposing substances which adhered to or contacted with the photocatalyst from the outside or for the purpose of disinfecting microorganisms. However, there is such a problem that the photocatalyst reacts with a substrate itself to oxidize or decompose it since the photocatalyst exerts a strong oxidizing action or decomposing action on the substrate.

As a method for forming a layer of a photocatalyst, a method wherein an active component (for example, titanium oxide) of a photocatalyst is applied or coated on the surface of a substrate by using a binder is known. In this method, however, excitation of the photocatalyst becomes weak since a coated film is formed even on the surface of the photocatalyst and thus reduction of the oxygen existing on the surface of the photocatalyst is delayed. On the other hand, there is a method wherein a photocatalyst is formed into a layer without using a binder so that an exposed surface of the photocatalyst is formed on the surface of a substrate. This method is preferable in the aspect of reaction efficiency with the photocatalyst since the more the active component of a photocatalyst is exposed on the surface of a substrate, the more readily the active component receives ultraviolet rays, and thus excitement of the photocatalyst is increased. However, when a layer of a photocatalyst is formed, for example, by a flame spray coating method to form an exposed surface of the photocatalyst on the surface of a substrate, minute spaces are produced among the particles of the active component of the photocatalyst in which spaces ultraviolet rays enter to cause problems such as oxidation and decomposition of the substrate.

DISCLOSURE OF THE INVENTION

An object of the present invention is to provide a photocatalyst module which exerts a strong action of photocatalyst and has means for preventing oxidation and/or decomposition of a substrate.

Another object of the present invention is to provide a process for producing the photocatalyst module described above.

Still another object of the present invention is to provide a photocatalyst reaction apparatus used for oxidizing or decomposing substances contained in water and to be decomposed, or used for disinfecting microorganisms contained in water without causing any damages to the apparatus.

Still another object of the present invention is to provide a photocatalyst reaction apparatus comprising a water tank on at least a part of the inner wall surface of which tank a photocatalyst is provided through a protective layer, to purify or disinfect water to be treated.

The term "module" means an independent part or unit of such an object as an instrument, apparatus, and the like (including part of or a part of the object), and the term "photocatalyst module" as used hereinafter is intended to mean a unit of the object provided with a photocatalyst or a layer of a photocatalyst on the surface thereof. Further, the term "photocatalyst module" as used hereinafter means a structure comprising a photocatalyst, a part of an inner wall surface of a reaction apparatus, and a protective layer provided between the photocatalyst and the wall.

As a way to resolve the problems described above, a photocatalyst module of the present invention is first summarized as follows:

(1) A photocatalyst module comprising a substrate, a photocatalyst, and a protective layer containing lithium silicate provided between the substrate and the photocatalyst.

According to the photocatalyst module summarized in (1) above, oxidation or decomposition of a substrate can be prevented since a protective layer containing lithium silicate which is not oxidized or decomposed by the action of the photocatalyst is provided between the substrate and the photocatalyst.

The photocatalyst is generally in a shape of a layer. On the other hand, the protective layer containing lithium silicate has a sufficiently high heat resistance. Accordingly, it is possible in the present invention to form a layer of a photocatalyst by employing a flame spray coating method, in which the temperature of the photocatalyst becomes higher than 1000° C., to obtain a photocatalyst module wherein the surface of the photocatalyst is exposed.

ore practical embodiments of the photocatalyst module of the present invention summarized in (1) above, together with advantageous effects of the embodiments, are described below.

(2) The photocatalyst module recited in paragraph (1) above wherein the protective layer containing lithium silicate is a film obtained by applying a paint prepared from a vehicle containing 80 to 90% by weight of lithium silicate and 10 to 20% by weight of sodium silicate on the surface of the substrate.

In the photocatalyst module described in (2) above, cracks scarcely occur on the surface of the protective layer since the layer is obtained by applying a paint prepared by using a vehicle containing lithium silicate and sodium silicate at a specific ratio, and as the result, an upper layer, that is, a layer of a photocatalyst can surely be formed.

(3) The photocatalyst module recited in paragraph (2) above wherein the vehicle further contains 0.1 to 10% by weight based on the total amount of the vehicle of a resin emulsion which is not gelatinized under an alkaline condition of a pH of 11 to 12.

The photocatalyst module described in (3) above has a high water resistance as a whole since a protective layer having a high water resistance is formed as the result of addition of a resin emulsion to the vehicle.

(4) The photocatalyst module recited in any one of paragraphs (1) to (3) above wherein the photocatalyst is titanium oxide.

According to the photocatalyst module described in (4) above, large effects on decomposition of substances adhered to the surface of the photocatalyst module and to be decomposed or large effects on disinfection of microorganisms contained in air due to a strong oxidizing action or decomposing action of the photocatalyst can be expected since the catalyst comprises titanium oxide.

A more specific embodiment of the photocatalyst module of the present invention is described as follows:

(5) The photocatalyst module recited in any one of paragraphs (1) to (4) wherein the photocatalyst is in a shape of a layer of particles.

Second, a process for producing a photocatalyst module of the present invention is summarized as follows:

(6) A process for producing a photocatalyst module having a layer of a photocatalyst on the surface thereof comprising forming a film containing lithium silicate on a substrate and then forming the layer of a photocatalyst on the surface of the film.

According to the process for producing a photocatalyst module of the present invention summarized in paragraph (6) above, a photocatalyst module in which oxidation or decomposition of a substrate is prevented is obtained since a protective layer is formed between the surface of the substrate and the layer of a photocatalyst.

More practical embodiments of the process for producing a photocatalyst module of the present invention summarized in (6) above, together with advantageous effects of the embodiments are described below.

(7) The process for producing a photocatalyst module recited in paragraph (6) above wherein the film containing lithium silicate is formed by applying a paint prepared from a vehicle containing 80 to 90% by weight of lithium silicate and 10 to 20% by weight of sodium silicate on the surface of the substrate.

The method for producing a photocatalyst module described in paragraph (7) above has advantages that formation of an upper layer, that is, a layer of a photocatalyst can surely and readily be performed since a protective layer formed on the surface of a substrate in advance by applying a paint prepared from a vehicle containing lithium silicate and sodium silicate at a specific ratio has a property that cracks are scarcely occur on the surface thereof even when an extender pigment was added to the paint.

(8) The process for producing a photocatalyst module recited in paragraph (7) above wherein the vehicle further contains 0.1 to 10% by weight based on the total amount of the vehicle of a resin emulsion which is not gelatinized under an alkaline condition of a pH of 11 to 12.

According to the process for producing a photocatalyst module of the present invention described in paragraph (8) above, a photocatalyst module to be obtained has an excellent water resistance as a whole since the water resistance of the film of lithium silicate is increased by adding a resin emulsion into the vehicle.

(9) The process for producing a photocatalyst module recited in any one of paragraphs (6) to (8) above wherein the molar ratio of lithium oxide ($Li_2O$) to silicon dioxide ($SiO_2$) (lithium oxide:silicon dioxide) in the lithium silicate is 1:3.

According to the process for producing a photocatalyst module of the present invention described in paragraph (9) above, it becomes possible to increase the adhesion strength of the film of lithium silicate to the surface of a substrate, for example, a metal, and the layer of a photocatalyst formed on the surface of the film of lithium silicate becomes firmer by using a lithium silicate in which the molar ratio of lithium oxide to silicon dioxide is 1:3.

(10) The process for producing a photocatalyst module recited in any one of paragraphs (6) to (9) above wherein the formation of said layer of a photocatalyst is carried out by a flame spray coating method.

According to the process for producing a photocatalyst module of the present invention described in paragraph (10) above, a photocatalyst module having active components of a photocatalyst exposed on the surface thereof and thus exerting a high photocatalytic action can be obtained.

Third, a photocatalyst reaction apparatus of the present invention is summarized as follows:

(11) A photocatalyst reaction apparatus provided with a photocatalyst module recited in any one of paragraphs (1) to (5).

The term "photocatalyst reaction apparatus" as used hereinafter is first intended to mean an apparatus which is used, as its principal purpose, for photocatalytic reaction. Example of such apparatus is a reaction bath or tank in which purification of water or the like is carried out by the action of a photocatalyst. Also, the term "photocatalyst reaction apparatus" as used hereinafter means an object (including an instrument, apparatus, facility, and the like) such as a soundproofing wall of a road and traffic sign in which a layer of a photocatalyst is formed on the surface thereof for the purpose of decomposing air contaminants such as nitrogen oxides (NOx) and sulfur oxides (SOx) or for the purpose of preventing air pollution. Such object has primarily other function, but an action of a photocatalyst can secondarily be expected from the object.

According to the photocatalyst reaction apparatus summarized in paragraph (11) above, the same effects as described with respect to the photocatalyst module of paragraphs (1) to (5) are obtained when the apparatus is used for the purpose of purifying water or purifying air pollutants.

More practical embodiments of the photocatalyst reaction apparatus of the present invention summarized in (11) above, together with advantageous effects of the embodiments, are described below.

(12) A photocatalyst reaction apparatus comprising a water tank provided with a photocatalyst module defined in any one of paragraphs (1) to (5), water introducing means, water discharging means, and means for radiating ultraviolet rays.

According to the photocatalyst reaction apparatus described in paragraph (12) above, hydroxy radicals or super oxides are formed by radiation of ultraviolet rays in water and thus it is possible to disinfect the water and to decompose the organic compounds contained in the water.

(13) A photocatalyst reaction apparatus comprising a water tank on at least a part of the inner wall surface of which tank a photocatalyst is provided through a protective layer containing lithium silicate, the water tank further having means for introducing water to be treated, means for discharging the treated water, and means for radiating ultraviolet rays each provided at or in the water tank.

The photocatalyst reaction apparatus described in paragraph (13) above can conveniently be employed in practical use for disinfecting water.

(14) The photocatalyst reaction apparatus recited in paragraph (13) above wherein the apparatus comprises at least two water tanks connected in series, the means for radiating ultraviolet rays provided in a first water tank is means for radiating ultraviolet rays of a medium wavelength of 170 to 260 nm, and the means for radiating ultraviolet rays provided in a second water tank is means for radiating ultraviolet rays of a long wavelength of 310 to 370 nm.

According to the photocatalyst reaction apparatus described in paragraph (14) above, the hydroxy radicals or super oxides formed by radiation of ultraviolet rays of a medium wavelength are converted back into water or oxygen, respectively, by receiving irradiation with ultraviolet rays of a long wavelength to obtain purified water.

(15) The photocatalyst reaction apparatus recited in paragraph (14) above wherein the apparatus further comprises a tank used for mixing ozone formed by radiating ultraviolet rays of a short wavelength of 183 to 184 nm to air with water to be treated and placed at a position preceding the first water tank in the order of treatments.

According to the photocatalyst reaction apparatus described in paragraph (15) above, disinfection of water can efficiently be performed by contacting ozone with water to be purified in advance of the irradiation of water with ultraviolet rays in the presence of a photocatalyst.

Figure 1:
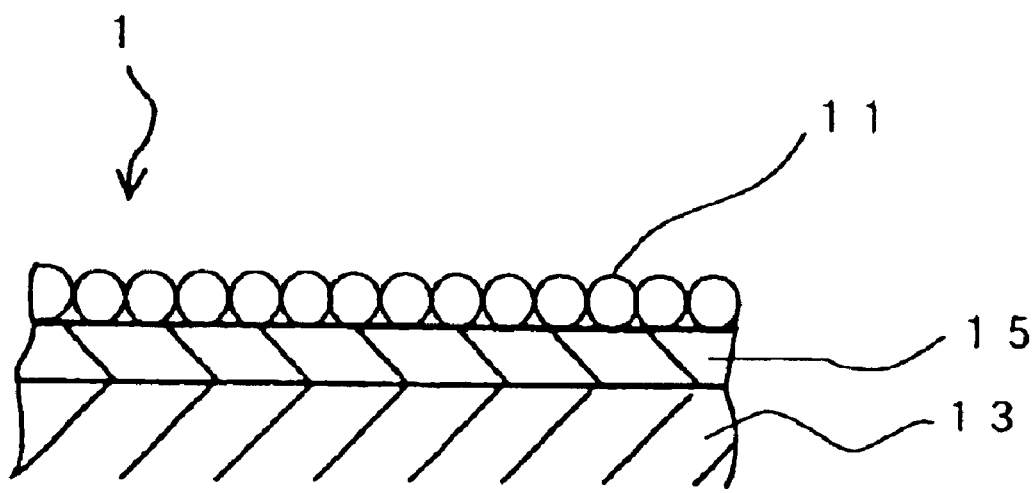
FIG. 1 is a schematic drawing for illustrating a cross sectional structure of a photocatalyst module of the present invention.

In the drawings, 1 and 2 are photocatalyst modules, 11 is a layer of a photocatalyst, 13 is a substrate, 15 is a protective layer (coated film of lithium silicate), S is a space, 21 is a reaction tank, 21A and 21B are reaction tanks used as devices for radiating ultraviolet rays in a water treating apparatus, 31, 31A and 31B are ultraviolet lamps, 35 is a wall, 40 is a pipe, 41 is a water introducing port, 43 is a water discharging port, 45 is a deaerating port, 50 is an apparatus for treating water, 51 is a pump, 52 is a device for taking air and radiating ultraviolet rays, 53 is a tank for mixing water with ozone and storing the mixture.

BEST MODE FOR CARRYING OUT THE INVENTION

As described above, the term "photocatalyst module" means a unit of an object provided with (a layer of) a photocatalyst on the surface thereof. The photocatalyst module of the present invention comprises as principle components a substrate, a photocatalyst, and a protective layer provided between the substrate and the photocatalyst.

Material for the substrate is not especially limited, and even a metal or synthetic resin which is easily oxidized or decomposed by the action of a photocatalyst can effectively be used as the material of the substrate for the photocatalyst module of the present invention. As the metal, for example, iron and aluminum can be mentioned.

As the material for the photocatalyst, for example, titanium oxide (titania) is preferable. While titanium oxide includes that of rutile type, brookite type, and anatase type crystal structure, titanium oxide comprising that of anatase type crystal structure is preferably used in the present invention. The photocatalyst is generally used in a shape of a layer of particles.

The protective layer is composed of a coated film containing lithium silicate. There exist several type of lithium silicates based on the difference in the molar ratio of lithium oxide ($Li_2O$) to silicon dioxide ($SiO_2$) (lithium oxide:silicon dioxide) therein, and a lithium silicate in which the molar ratio of lithium oxide to silicon dioxide is 1:3 is preferable since the lithium silicate has a high adhesion strength to the substrate. As the lithium silicate described above, for example, Lithium Silicate #35 (trade name of a lithium silicate produced by Japan Chemical Industry, Corp. (Nihon Kagaku Kogyo Kabushiki Kaisha).

Next, a method for producing a photocatalyst module of the present invention is described in more detail.

A photocatalyst module of the present invention is desirably produced by forming a film containing lithium silicate on the surface of a substrate and then forming a layer of a photocatalyst on the protective layer. First, the protective layer is a film formed by applying a paint prepared from a vehicle containing preferably 80 to 90% by weight, more desirably 85 to 90% by weight of lithium silicate and containing 10 to 20% by weight, more desirably 10 to 15% by weight of sodium silicate on the surface of the substrate. Generally speaking, it is very difficult to form a hard coated film from an aqueous paint. A film of lithium silicate has such a defect that whereas a coated film formed of lithium silicate alone is not cracked when the film is very thin, the film is cracked to form cracks in such a shape as of a spider's web in the film when the film has a certain thickness or when an extender pigment is added in the paint. Accordingly, lithium silicate is scarcely used for paint up to now. However, when sodium silicate is added to lithium silicate, occurrence of the cracks can be prevented.

That is, when 10% by weight or more of sodium silicate is contained in the vehicle, occurrence of cracks can significantly be reduced. When 15% by weight or more of sodium silicate is contained, occurrence of cracks can more certainly be prevented. When the amount of sodium silicate is too large, however, the protective layer comes to readily dissolve in water and the water resistance of the protective layer lowers. Accordingly, the upper limit of sodium silicate to be contained in the vehicle is preferably about 20% by weight.

Whereas a coated film prepared from a vehicle in which about 15% by weight of sodium silicate was included slightly lowers in water resistance at first, the water resistance increases when a long period of time (for example, 3 to 6 months) has passed since sodium silicate reacts with a carbonate and the like in air to become insoluble in water.

Besides, it is possible to increase the water resistance of a coated film of lithium silicate in a shorter period of time by adding an aqueous resin emulsion in the vehicle. That is, the resin emulsion disperses in a coated film containing lithium silicate and sodium silicate in this case to prevent dissolution of the coated film. Accordingly, the film the water resistance of which was increased by the addition of a resin emulsion is whitened from a transparent state, for instance, when immersed in water, but the film is not dissolved in water.

The aqueous emulsion described above preferably should not be gelatinized under a strong alkaline condition of a pH of around 11 to 12 from the aspect of maintaining long can-life. This is because the vehicle containing lithium silicate and sodium silicate described above becomes a strong alkaline of a pH of around 11 to 12, and many aqueous resin emulsions are gelatinized into a state of a gum (gum-up).

As a preferable resin emulsion, for example, an acrylic emulsion can be used. Also, a resin emulsion available on the market is preferably employed. As the acrylic emulsion, Rika Bond ES-56 (trade name of an acrylic emulsion produced by Central Science Industry, Corp. (Chuo Rika Kogyo Kabushiki Kaisha)) can be mentioned.

The resin emulsion is preferably added to the vehicle described above in an amount of about 10% by weight or less, for example, about 0.1 to 10% by weight, and more desirably about 5 to 10% by weight. When the amount of the resin emulsion added becomes too large, it sometimes becomes impossible to obtain a protective layer having a hard surface inherent to an inorganic material and having a heat resistance and fire resistance. Accordingly, the resin emulsion is preferably added in the range described above.

The vehicle is transformed into a paint by adding an extender pigment such as white alumina into the vehicle while slowly agitating to bring about a state of the vehicle in which lumps of pigment particles do not exist, adding a coloring pigment such as titanium white thereto, and then subjecting the vehicle to a filtration. As the extender pigment described above, an extender pigment having a particle size of 400 mesh or less is preferable. In the filtration, a filter medium of about 80 mesh (for example, nylon mesh) is preferably used.

When a paint containing lithium silicate thus obtained is applied on a substrate made of such a water non-absorptive material as steel, a film can be formed by applying the paint on the surface of the substrate twice each in an amount of 100 to 150 $g/m^2$. The thickness of the film is preferably about 0.5 to about 0.75 mm.

In the case where the paint is applied on a substrate made of such a water absorptive material as concrete or mortar, a film can be formed, for instance, by printing a liquid prepared by mixing lithium silicate with water at the ratio of 1:1 on the substrate in an amount of 200 to 300 $g/m^2$ by using a coating roller, drying the coated film, applying the paint described above thereon in an amount of 150 $g/m^2$ once (when the paint was applied twice or more, the surface of a coating roller becomes stippling) by a roll coating to form a smooth surface, drying the coated film, and then applying, as a finishing top coat, the paint once more in an amount of 150 $g/m^2$ for adjusting color.

The coated film of lithium silicate thus formed has advantages as follows:

(1) The film is remarkably resistant to heat compared with organic films such an extent that it can stand a high temperature of higher than 900° C., and incombustible. Further, the film is safe since it does not generate a toxic gas even at the time of a fire.
(2) The film has a long-term durability, and has an excellent abrasion resistance since a large amount of fine particles of a metal oxide are mixed therein.
(3) The film can be employed in a wide range of uses since it has a resistance to a wide range of acids, chemical agents, and oils.
(4) When a substrate is water absorptive, the film is particularly excellent in adhesion strength to the substrate since a part of the paint infiltrates in the substrate and comes to be integrated therewith.
(5) Safety of workers at the time of using the film is high. That is, although there are cases in industry where generated gases catch fire or workers inhale a gas to cause a skin allergy since organic paints are used many times together with a solvent or curing agent, there is no need to worry about such problems when a paint of lithium silicate is used.
(6) When the film is used, it is possible to protect concrete or steel used as substrate from deterioration for a long period of time since the film has an abrasion resistance and a high dust-proofing effect.

While the formation of a layer of a photocatalyst on the surface of a protective layer containing lithium silicate can be carried out by a known method, for example, a flame spray coating method or sol-gel method, the flame spray coating method is preferable from the fact that active components of the photocatalyst can be exposed on the surface thereof. As the flame spray coating used in the present invention, a plasma spray coating in the air (APS), plasma spray coating under a low pressure (LPC), or high velocity flame spray coating can be used, but the plasma spray coating in the air (APS) is preferable.

When a layer or film of a photocatalyst is formed, for instance, by a plasma spray coating in the air, particles of the photocatalyst are adjusted to a particle size of about 10 to about 60 $\mu$m, a granulation binder such as polyvinyl alcohol (PVA) is added thereto, and then the mixture is sprayed at a high temperature of 10,000 to 20,000° C. At this time, temperature becomes about 200 to 300° C. on the surface of the substance (film of lithium silicate) to which the spray is emitted. While a preferable flying speed of photocatalyst particles to be sprayed is varied according to the size and density of the particles, a speed of about 100 to about 300 m/sec is preferable. The thickness of a layer of a photocatalyst is preferably about 0.3 to about 0.5 mm. Besides, it is preferable to adjust a layer of a photocatalyst so as to have a bonding (or adhesive) strength of 150 to 400 $kg/cm^2$, a void content of 1 to 10%, and a hardness of about 650 to 800 kg/mm.

A photocatalyst reaction apparatus of the present invention is provided, in at least a portion in the apparatus, with the photocatalyst module described above. In a preferred embodiment, a photocatalyst reaction apparatus of the present invention comprises a water tank provided with the photocatalyst module. In a photocatalyst reaction apparatus of the present invention, a photocatalyst may be provided through a protective layer containing lithium silicate on at least a part of the inner wall surface of the tank instead of using the photocatalyst module.

As described above, a photocatalyst reaction apparatus of the present invention means not only an apparatus used principally for performing photocatalytic reaction, but also an object (including an instrument, apparatus, facility, and the like) which has a layer of a photocatalyst on its surface for the purpose of decomposing pollutants, controlling pollution, or disinfecting bacteria and thus secondarily exhibits a photocatalytic action, while having another function. As the examples of such object, a water purification apparatus, air-cleaning device, deodorizing device, sound-proofing wall of a road, traffic sign, cover of lighting fixtures, outer wall or inner wall of architectures, and tile can be mentioned.

Figure 2:
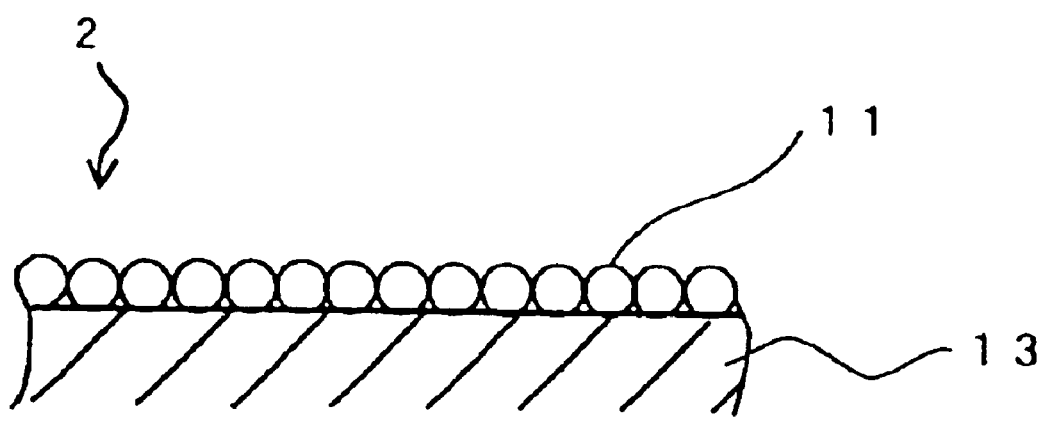
FIG. 2 is a schematic drawing for illustrating a cross sectional structure of a conventional photocatalyst module.
Figure 3:
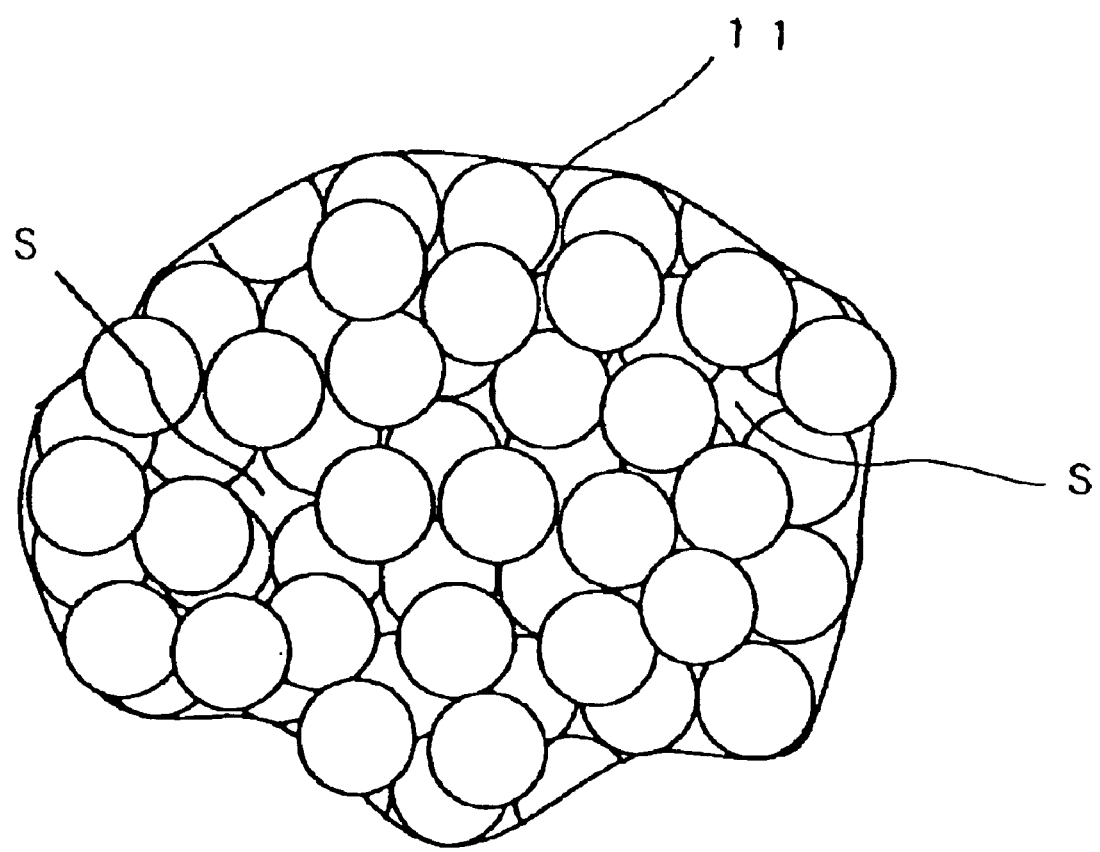
FIG. 3 is a schematic drawing for illustrating the state of the surface of a conventional photocatalyst module.

Now, the present invention is described in more detail with reference to the drawings. FIG. 1 is a schematic drawing for illustrating a cross sectional structure of photocatalyst module 1 of the present invention. FIG. 2 is a schematic drawing for illustrating a cross sectional structure of conventional photocatalyst module 2. FIG. 3 is a schematic drawing for illustrating the state of the surface of a conventional photocatalyst module in which a layer of a photocatalyst is formed by a flame spray coating. As described above, in photocatalyst module 2 in which a layer 11 of photocatalyst particles is formed directly on the surface of substrate 13, for example, a metalic plate, spaces S are inevitably produced among spherical active components (for example, particles of titanium oxide) of a photocatalyst as shown in FIG. 2 and particularly in FIG. 3. Then, ultraviolet rays enter into the spaces S, and thus oxidation or decomposition of the substrate 13 is caused due to the action by the photocatalyst. For instance, when the substrate 13 is a metallic plate, the surface of the substrates gathers rust.

In contrast to photocatalyst module 2, in photocatalyst module 1, film 15 containing inorganic lithium silicate, which is not decomposed by a photocatalyst, is provided as a protective layer between substrate 13 and layer 11 of a photocatalyst as shown in FIG. 1, and thus deterioration of the substrate by the action of a photocatalyst can be prevented. Besides, since the film 15 which contains lithium silicate has both a heat resistance and adhesive property, it is possible to subject a photocatalyst to a flame spray coating at a high temperature when layer 11 of a photocatalyst is formed, and the film 15 acts even as binder for increasing the adhesion of the surface of substrate 13 with layer 11 of a photocatalyst.

Figure 4:
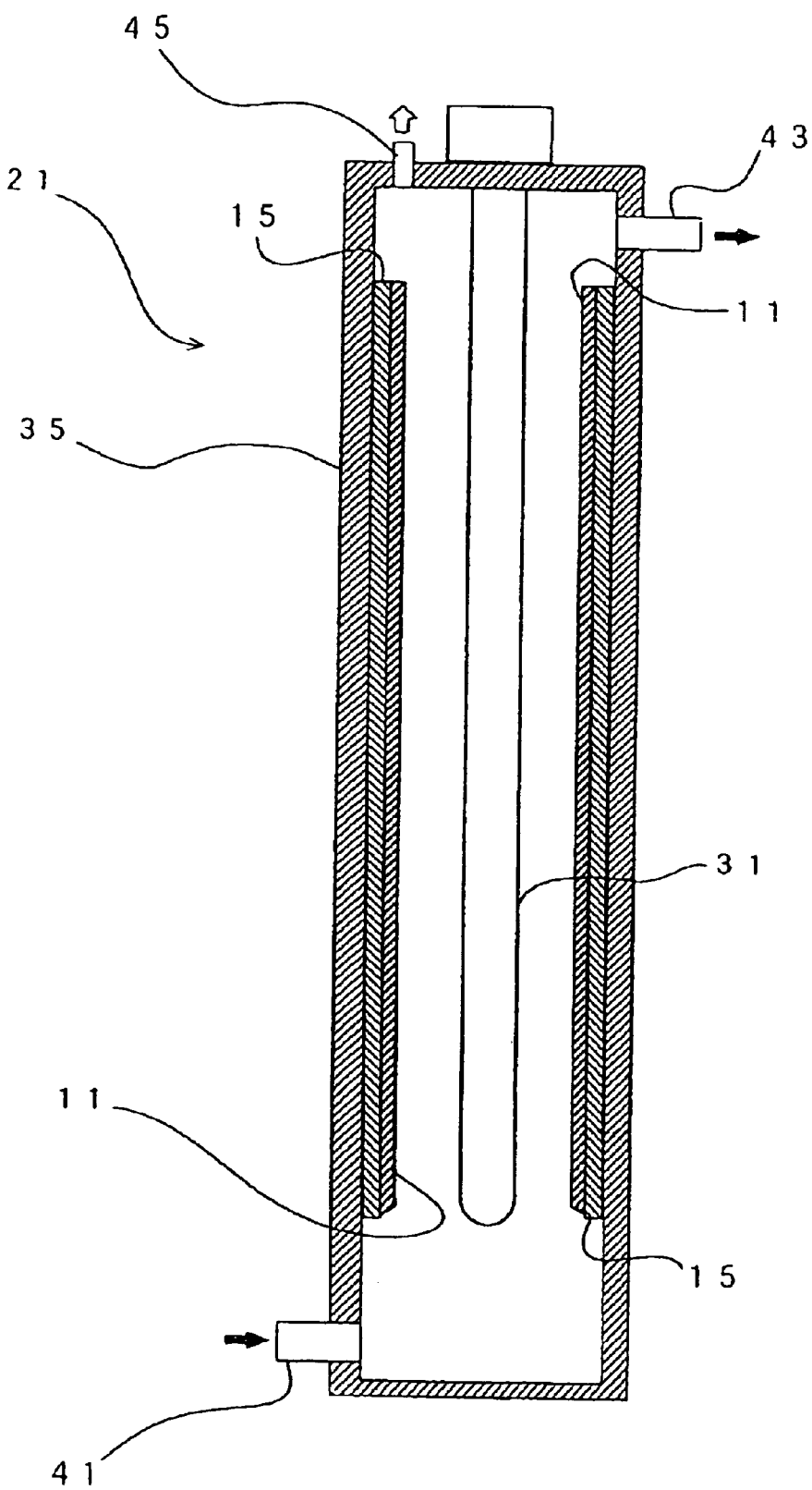
FIG. 4 is a schematic drawing for illustrating an example of photocatalyst reaction apparatuses of the present invention.

FIG. 4 is a schematic drawing for illustrating a cross sectional structure of reaction tank 21 in a water purification apparatus which is an example of the photocatalyst reaction apparatuses of the present invention. The reaction tank 21 is cylindrical, provided at its center with portion 31 for radiating ultraviolet rays, and provided with layer 11 of a photocatalyst comprising titanium oxide through protective layer (film of lithium silicate) 15 formed on inner wall 35 thereof. In the drawings, the thickness of layer 11 of a photocatalyst and protective layer 15 are depicted in exaggeration for convenience of explanation. The reaction tank 21 is constructed so that a liquid to be treated (for example, drain water) is flowed from water introducing port 41 into the reaction tank, moved upward in reaction tank 21, and then discharged outside from water discharging port 43. In the process of moving upward in reaction tank 21, the water to be treated is purified by being irradiated with ultraviolet rays sent from portion 31 for radiating ultraviolet rays and by being subjected to the action of a photocatalyst. That is, ultraviolet rays from portion 31 for radiating ultraviolet rays reach the surface of layer 11 of a photocatalyst, and thus hydroxy radicals and super oxide anions are efficiently formed to decompose or disinfect object substances of the treatment contained in the liquid and contacted to the photocatalyst. Examples of such object substances include hardly decomposable substances such as chlorine containing compounds, other organic compounds, and microorganisms. In reaction tank 21 of a water purifying apparatus, wall 35 (corresponding to substrate) is generally placed in a condition of being susceptible to the action of photocatalyst since the contact of wall 35 with water is inevitable and the wall continuously receives radiation of ultraviolet rays at certain intensity. However, in the reaction tank 21 shown in FIG. 4, deterioration in the quality (for example, corrosion) of material of wall 35 can surely be prevented since layer 11 of a photocatalyst and wall 35 are isolated from each other by providing protective layer 15 between them.

Figure 5:
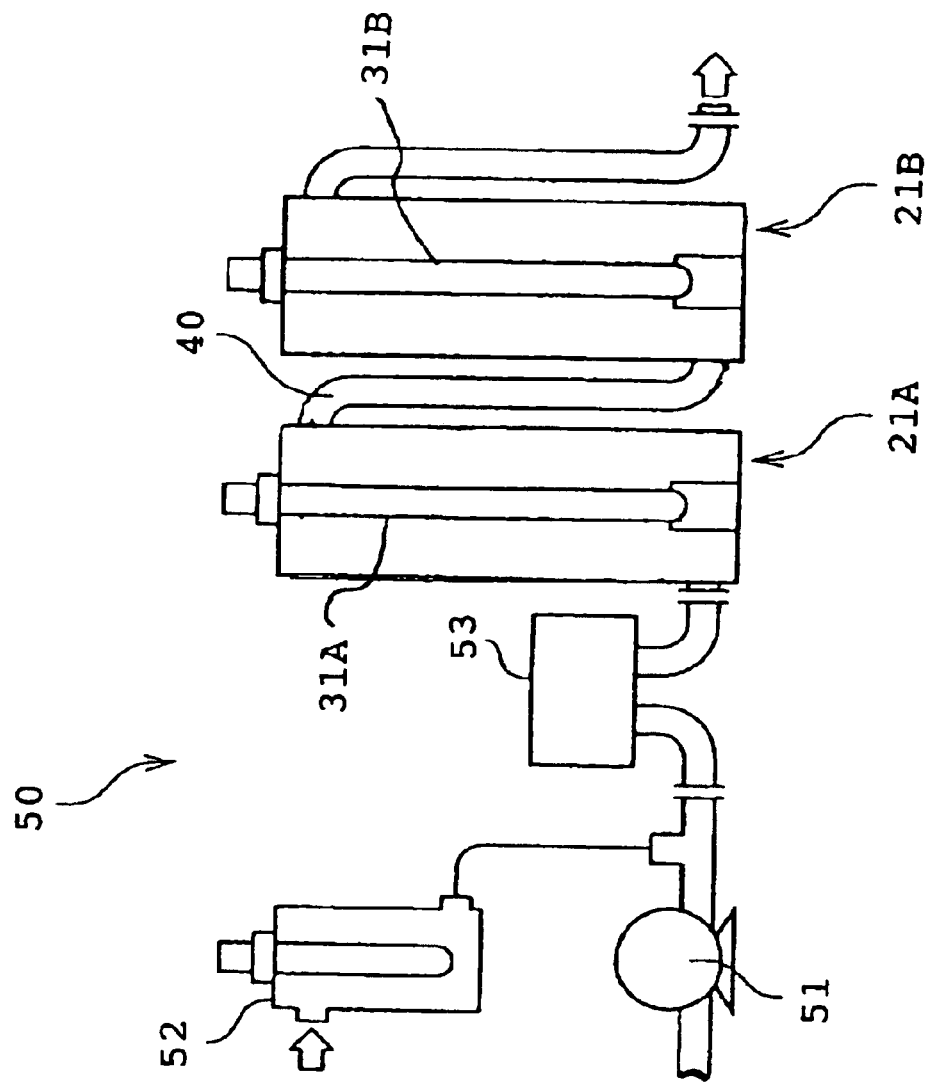
FIG. 5 is a schematic drawing for illustrating an example of apparatuses used for treating water and comprising a photocatalyst reaction apparatus of the present invention.

FIG. 5 shows a schematic drawing for illustrating an example of the apparatuse used for treating water and comprising a photocatalyst reaction apparatus of the present invention. Apparatus 50 for treating water comprises pump 51 used for introducing water, device 52 for taking air and radiating ultraviolet rays of a short wavelength to the air, tank 53 used both for mixing the water introduced by the pump 51 with the ozone formed in the device 52 described above and for storing the mixture, device 21A for radiating ultraviolet rays of a medium wavelength to the water supplied from tank 53 to disinfect bacteria contained in the water by oxidizing action and to oxidize organic compounds contained in the water to decompose, and device 21B for radiating ultraviolet rays of a long wavelength to the water which passed through device 21A. Device 21A for radiating ultraviolet rays of a medium wavelength and device 21B for radiating ultraviolet rays of a long wavelength have basically the same structure as that of the reaction apparatus 21 shown in FIG. 4, and are provided on their inner wall surfaces with protective layers and layers of a photocatalyst as described above.

In device 52 for taking air and radiating ultraviolet rays of a short wavelength, ultraviolet rays of a short wavelength, for example, 183 to 184 nm (especially 184 nm) are radiated with an ultraviolet lamp into air, and the oxygen molecule ($O_2$) in the air is converted into oxygen atom (O) of ground state and then reacts with surrounding oxygen molecule ($O_2$) to form ozone ($O_3$). The ultraviolet lamp comprises a silica glass tube having two electrodes provided therein, and ultraviolet rays of a specific wavelength can be obtained by applying a potential difference between the electrodes. The ozone formed in a device for radiating ultraviolet rays of a short wavelength is mixed with water supplied with pump 51, and enters in tank 53. The water which contains ozone and is stored in tank 53 is then introduced into device 21A for radiating ultraviolet rays of a medium wavelength.

In device 21A for radiating ultraviolet rays of a medium wavelength, ultraviolet rays of a medium wavelength, for example, 254 nm are radiated with ultraviolet lamp 31A. The ozone in the water radiated by ultraviolet rays of a medium wavelength is divided into oxygen atom of singlet and oxygen molecule of singlet. The active oxygen (oxygen atom of singlet and the like) formed at this stage has a high energy, and thus can disinfect water by its disinfecting action and decompose even chlorine containing organic compounds (for example, trihalomethane) and the like.

As shown in the FIG. 4 described above, a photocatalyst provided on the inner wall of device 21A for radiating ultraviolet rays of a medium wavelength forms super oxide ion ($O_2^-$) and hydroxy radical ($\cdot OH$) from water and dissolved oxygen by being irradiated with ultraviolet rays of a medium wavelength (for example, 254 nm). These super oxide ion ($O_2^-$) and hydroxy radical ($\cdot OH$) have a strong oxidizing power and decompose bacteria and organic compounds.

The water treated within device 21A for radiating ultraviolet rays of a medium wavelength is discharged from a water discharging port formed at an upper part of the device, passed through pipe 40, and then entered into device 21B for radiating ultraviolet rays of a long wavelength from a lower part of the device 21B.

In device 21B for radiating ultraviolet rays of a long wavelength, the super oxide ($O_2^-$) contained in the water becomes oxygen molecule ($O_2$), and hydroxy radical ($\cdot OH$) takes one hydrogen atom (H) from surrounding water ($H_2O$) to form active water ($H_2O$) thereby to provide purified water by radiating ultraviolet rays of a long wavelength (for example, 310 to 360 nm) with ultraviolet lamp 31B to the active oxygen and the like formed in device 21A for radiating ultraviolet rays of a medium wavelength.

EXAMPLES

Now, the present invention will be described in more detail with reference to Referential Example, Example, Comparative Examples, and Test Examples. However, it should be understood that the scope of the present invention is by no means restricted by such specific examples.

Referential Example (Formation of a Protective Layer Containing Lithium Silicate)

(1) Preparation of Vehicles

Three kind of vehicles used for forming protective layers and having chemical compositions as shown in Table 1 were prepared by the procedures described below.

TABLE 1

| Blending ratio | Vehicle 1 | Vehicle 2 | Vehicle 3 |
| --- | --- | --- | --- |
| Lithium silicate (*1) | 85 | 80.75 | 76.5 |
| Sodium silicate (*2) | 15 | 14.25 | 13.5 |
| Resin emulsion (*3) | 0 | 5 | 10 |

(Unit: parts by weight)
*1 Lithium silicate #35 (trade name of lithium silicate produced by Japan Chemical Industry, Corp.)
*2 Sodium silicate #3 (trade name of lithium silicate produced by Japan Chemical Industry, Corp.)
*3 Rika Bond EX-56 (trade name of an acrylic emulsion produced by Central Science Industry, Corp.)

<Procedures for Preparing Vehicles>

Lithium silicate #35 was weighed, lithium silicate #3 was added thereto, and the resin emulsion shown in Table 1 was slowly added, and the mixture was stirred to form homogeneous vehicles. (In the case of vehicle 1, addition of the resin emulsion was omitted.)

(2) Preparation of Paints

Particles of white alumina (having a mesh of 400 or less) were added to the vehicles while being slowly stirred such that lumps of the particles of white alumina were not formed. Subsequently, particles of titanium white as a coloring pigment were added thereto. Addition of the particles of titanium white was terminated at a state where lumps of particles were not formed. The mixtures thus formed were subjected to a filtration by using nylon cloths (80 mesh or less) to obtain paints. Chemical compositions of the paints thus obtained are shown in Table 2.

TABLE 2

| | Paint 1 | Paint 2 |
| --- | --- | --- |
| Lithium silicate (*1) | 38.25 | 34.4 |
| Sodium silicate (*2) | 6.75 | 6.07 |
| White alumina (400 mesh) (*3) | 50 | 50 |
| Titanium white (*4) | 5 | 5 |
| Water | 4.5~5 | 4.5~5 |

(Unit: parts by weight)
*1 Lithium silicate #35 (trade name of lithium silicate produced by Japan Chemical Industry, Corp.)
*2 Sodium silicate #3 (trade name of lithium silicate produced by Japan Chemical Industry, Corp.)
*3 White alumina 43L (trade name of white alumina produced by Showa Denko)
*4 Curonosu (trade name of titanium white produced by Titanium Industry. Corp.)

(3) Performance Test of Coated Films

Coated films formed by applying the paints obtained by the procedures described above on the surface of a substrate were subjected to performance tests according to JIS. The results thus obtained are shown below.

(i) Resistance to abrasive wear (JIS K7204)
Average 0.42 g
0.09 mm
Test conditions:
Abrasion wheel: H-22, Number of revolutions: 1000, Test load: 4.9 N (ii) Weather resistance (JIS A6909)
Color difference: 0.3

Sensuous expression of color difference:

| | |
| --- | --- |
| 0~0.5 | /faintly |
| 0.5~1.5 | /slightly |
| 1.5~3.0 | /conspicuous |

(iii) Adhesion strength (JIS A5909)

| | |
| --- | --- |
| Standard condition: | 2.6 N/mm$^2$ |
| After immersed in water: | 2.8 N/mm$^2$ |

(iv) Slip properties (JIS A1454)

| | |
| --- | --- |
| Surface condition a (cleaned and dried): | 1.054 |
| Surface condition b (water sprinkled): | 1.071 |

(v) Heat resistance (JIS A1321 according to JIS A6909 6.24)

| | |
| --- | --- |
| Detrimental change in deodorization: | None |
| Melting up to front surface: | None |
| Occurrence of cracks: | None |
| Afterglow: | 0 second |

Came up to flame retardant rating 1 defined in JIS A1321.

(vi) Scratch resistance (pencil scratch value: JIS K5400)
No scratch was made even at 9H.

(vii) Stain resistance (JIS A1454: 48 hours spot test)
Spot test for 48 hours with chemicals shown in Table 3 were carried out and the results obtained are shown together in Table 3.

TABLE 3

| Chemicals | 5% sulfuric acid | 15% sulfuric acid | 10% hydrochloric acid | 5% acetic acid | 10% lactic acid | 10% citric acid | 10% sodium hydroxide |
| --- | --- | --- | --- | --- | --- | --- | --- |
| Result | ⊚ | ⊚ | ⊚ | ⊚ | ⊚ | ⊚ | Δ |

Evaluation criteria:
⊚: Appearance was not changed, Δ: Appearance was changed some extent, x: Appearance was changed to poor

Example 1

1. Formation of a Protective Layer Containing Lithium Silicate

A paint containing lithium silicate (Paint 2 shown in Table 2) was applied on the surface of a steel pate as substrate twice each in an amount of 100 to 150 g/m$^2$ by using a coating roller to form a layer of 0.5 to 0.75 mm thick.

2. Formation of a Layer of a Photocatalyst

The size of particles of titania (titanium dioxide) was adjusted to about 10 to about 60 μm and a polyvinyl alcohol (PVA) as a granulating binder was mixed therewith.

On the surface of the protective layer containing lithium silicate formed on the surface of a steel plate by the procedure described in 1 above, the mixture of the titania particles and PVA was sprayed by a plasma spray coating method in air at a high temperature of 10,000 to 20,000° C. to form a layer of titania photocatalyst. The thickness of the layer of the photocatalyst thus formed was 0.3 to 0.5 mm.

Further, the photocatalyst layer had an adhesion strength of 150 to 400 kg/cm², void content of 1 to 10%, and hardness of 650 to 800 kg/mm.

In the photocatalyst module thus obtained, the photocatalyst was exposed on its surface, and the photocatalyst module had a high photocatalytic action.

Comparative Example 1

Example 1 was repeated to obtain a comparative photocatalyst module with the exception that a protective layer containing lithium silicate was not used so that a layer of the photocatalyst was formed directly on the surface of a steel plate.

Comparative Example 2

Example 1 was repeated to obtain another comparative photocatalyst module with the exception that a protective layer containing lithium silicate was not used so that a layer of the photocatalyst was formed directly on the surface of a steel plate, and that the photocatalyst layer was formed by a sol-gel method under such conditions described below.

That is, in the sol-gel method, a layer of the photocatalyst was formed such that 1 g of titanium dioxide particles occupied 70 m² of the surface of a substrate (steel plate), and the layer was cured at 250 to 600° C. for an hour. Besides, the size of the titanium dioxide particles in the sol was 8 to 20 nm.

The thickness of the photocatalyst layer thus formed was 0.51 to 1.0 mm.

Test of Photocatalyst Modules

Photocatalyst modules obtained in Example 1, and Comparative Examples 1 and 2, respectively, were tested to determine their corrosion resistance.

<Method of Testing>

On the surface of each of three sample photocatalyst modules obtained in the Example or Comparative Examples, was dropped a testing liquid (10% sulfuric acid and 10% hydrochloric acid) by using a dropping pipette, a watch glass was put thereon, and the deterioration of the photocatalyst layer and the surface of the substrate 1 day, 2 days, 3 days, or 1 week after were evaluated by naked eye.

<Test Results>

With the layer of the photocatalyst, deterioration was not noticed for any of the photocatalyst modules tested. However, when the layer of the photocatalyst and protective layer of lithium silicate were removed and then the condition of the surface of the substrates was observed, no deterioration was found with the photocatalyst modules of Example 1, whereas traces of corrosion by inorganic acids were confirmed on the surface of the substrates 3 days or 1 week after with the photocatalyst modules of Comparative Example 1 or 2. Accordingly, it is predicted that when the photocatalyst modules were allowed to stand together with the acids used in the tests for a longer period of time, the corrosion will proceed even to the inside of the substrates.

According to the present invention, the oxidation or decomposition of a substrate can be prevented by a protective layer provided between the substrate and a layer of a photocatalyst. Further, since a protective layer containing lithium silicate has a sufficiently high heat resistance, it is possible to form a layer of a photocatalyst by a flame spray coating method in which the temperature of catalyst reaches higher than 1000° C., and a photocatalyst module in which a photocatalyst is exposed to the surface thereof so that the module exhibits a high reactivity can be produced.

What is claimed is:

1. A photocatalyst reaction apparatus comprising a tank used for mixing ozone formed by radiating ultraviolet rays of a short wavelength of 183 to 184 nm to air mixed with water to be treated, and at least two water tanks connected in series, on at least a part of the inner wall surface of said tanks a photocatalyst is provided through a protective layer containing lithium silicate, the water tanks further having means for introducing water to be treated, means for discharging the treated water, and means for radiating ultraviolet rays each provided at or in the water tanks, the means for radiating ultraviolet rays provided in a first water tank is means for radiating ultraviolet rays of a medium wavelength of 170 to 260 nm, and the means for radiating ultraviolet rays provided in a second water tank is means for radiating ultraviolet rays of a long wavelength of 310 to 370 nm.

2. The photocatalyst reaction apparatus according to claim 1, wherein said protective layer containing lithium silicate is a film obtained by applying a paint prepared from a vehicle containing 80 to 90% by weight of lithium silicate and 10 to 20% by weight of sodium silicate on the surface of said substrate.

3. The photocatalyst reaction apparatus according to claim 2 wherein said vehicle further contains 0.1 to 10% by weight of a resin emulsion which is not gelatinized under an alkaline condition of a pH of 11 to 12.

4. The photocatalyst reaction apparatus according to claim 1 wherein said photocatalyst is titanium oxide.

5. The photocatalyst reaction apparatus according to claim 1, wherein said photocatalyst is in a shape of a layer of particles.

* * * * *